United States Patent [19]

Karton et al.

[11] Patent Number: 5,531,930
[45] Date of Patent: Jul. 2, 1996

[54] ALUMINUM METAL COMPOSITION FLAKE HAVING REDUCED COATING

[75] Inventors: Yishai Karton, Ness-Ziona; Moshe Kleiman, Yavne, both of Israel

[73] Assignee: Israel Institute for Biological Research, Ness Ziona, Israel

[21] Appl. No.: 225,999

[22] Filed: Apr. 12, 1994

[51] Int. Cl.$^6$ .............................. C09K 3/00; B22F 1/02; B32B 15/02

[52] U.S. Cl. .................. 252/363.5; 75/255; 102/334; 252/305; 252/587; 342/3; 428/403

[58] Field of Search .................. 252/363.5; 428/402.24, 428/403; 106/404; 75/255

[56] References Cited

U.S. PATENT DOCUMENTS

| | | | |
|---|---|---|---|
| 2,178,179 | 10/1939 | McMahan | 106/404 |
| 2,234,164 | 3/1941 | Harris | 106/404 |
| 2,309,377 | 1/1943 | Babcock | 106/243 |
| 3,244,542 | 4/1966 | Brown et al. | 106/277 |
| 3,333,950 | 8/1967 | Hill | 75/0.5 |
| 3,901,688 | 8/1975 | Casey et al. | 75/0.5 |
| 3,975,292 | 8/1976 | Shaffer | 252/305 |
| 4,100,102 | 7/1978 | Shaffer | 252/305 |
| 4,286,498 | 9/1981 | Block et al. | 86/1.1 |
| 4,484,195 | 11/1984 | Shaffer | 250/338.1 |
| 4,522,655 | 6/1985 | Claassen et al. | 106/290 |
| 4,622,899 | 11/1986 | Weber | 102/334 |
| 4,704,966 | 11/1987 | Sellman et al. | 102/334 |
| 4,704,967 | 11/1987 | Milstead et al. | 102/334 |
| 5,233,927 | 8/1993 | Wulvik | 102/334 |

*Primary Examiner*—Richard D. Lovering
*Attorney, Agent, or Firm*—Nixon & Vanderhye

[57] ABSTRACT

Infrared, visible or mm. radiation is screened by an aerosol comprising flakes (0.03–0.3×1.5–20 microns) of aluminum metal composition, having a mass extinction coefficient of at least 4.5 m$^2$/g in respect of infrared radiation and at least 3.5 m$^2$/g in respect of visible radiation. The invention includes also the flakes per se, and formulations containing them, the flakes being additionally characterized by the facts that the amount of manufacturing process additive with which they are coated has been reduced to between 0 and 2.5 weight percent, and that they have a bulk density at least 0.5, preferably at least 1.5 g/cc. The reduction in the coating additive may be achieved by modifying the amount of additive used in the manufacturing process, or by treating the conventionally manufactured flakes with solvents to reduce the amount of coating additive to the desired level. Compressing the thus-treated flakes increases bulk density, with no significant reduction in the mass extinction coefficient.

17 Claims, No Drawings

ALUMINUM METAL COMPOSITION FLAKE HAVING REDUCED COATING

FIELD OF THE INVENTION

The present invention relates to flakes of aluminum metal composition, formulations comprising them and a method for screening radiation utilizing an aerosol comprising such flakes.

BACKGROUND OF THE INVENTION

Metal flakes of copper or aluminum composition of submicron thickness and multimicron lateral face dimensions are recognized to be a potential source for an infrared screening cloud for military purposes. The metal powder is packed in a camouflage system such as a canister, missile, rocket or a gas generator and dispersed in the atmosphere. The cloud or aerosol that is formed camouflages and/or screens point targets on fortresses, air parts etc., especially against attacking precisely guided weapons.

Thus, U.S. Pat. No. 4,100,102 (Shaffer) describes a composition for use in generating a protective aerosol, consisting essentially of a suspension of 30–40 wt. % aluminum particles in 60–70 wt. % of vaporizable hydrocarbon oil, the aluminum particles having diameters in the range 2–20 microns and thicknesses of <0.3 micron. The specification of this patent makes clear that these "particles" are in fact flakes, which are commercially available for use as a pigment. In an example, the mass extinction coefficient of these aluminum flakes, termed in this patent the "J-value", is shown to lie within the range 2.3–2.5 $m^2/g$ in respect of infrared radiation.

Moreover, U.S. Pat. No. 3,975,292 (Shaffer) describes a method for forming a protective aerosol, wherein a suspension of aluminum particles in a hydrocarbon oil are fed into a hot, high velocity gas stream, the temperature of which is sufficiently high to vaporize the oil, the mixed stream of hot gases, hydrocarbon oil and aluminum particles (having diameters in the range 2–20 microns and thicknesses of <0.3 micron) being discharged into the atmosphere. U.S. Pat. No. 4,484,195 (Shaffer) describes a method of screening infrared radiation using an aerosol of aluminum particles having essentially dimensions of the same order of magnitude as the wavelengths of such radiation.

The use of aluminum is also featured in U.S. Pat. No. 4,286,498 (Block et al), wherein there is described a method for producing burst charges for dispersing energy generating material in an effective pattern for confusing energy sensing devices (operating on infrared, sonar or microwave reflected energy) wherein $KClO_4$ (5 pbw) which has passed through a #20 screen is mixed with black aluminum (2 pbw), screening the mixture through a #20 screen a predetermined no. of times, and placing a fusing member therein.

The use of copper composition flakes is featured for example in U.S. Pat. No. 4,704,966 (Sellman et al), which describes a method of screening against visual and infrared light by injecting into the atmosphere a cloud of fine metal flakes of submicron thickness and multimicron lateral face dimensions and comprised of a copper composition, the cloud being formed by bursting a compacted cohesive solid mass of the metal flakes in the atmosphere, thereby forming a dispersed aerosol.

Furthermore, U.S. Pat. No. 4,704,967 (Milstead et al) describes a product for screening against visual and infrared light, made by slurrying fine metal flakes of submicron thickness and multimicron lateral face dimensions and in particular comprised of a copper composition, with a volatile liquid to wet the flakes, which adhere to one another in compacted form at the bottom of the slurry, the liquid being removed to leave a mutually face-to-face compact adhered solid mass of metal flakes. In practice, the compacted slurry is extruded and the wet extrusions are cut into small segments and removal of the liquid is effected by evaporative drying.

The use of additives admixed with the metal powder or flakes is featured e.g. in U.S. Pat. No. 4,622,899 (Weber), which describes a smoke generating projectile containing both optical smoke powder and infrared absorbing powder, besides igniter compositions. The infrared absorbing powder may be copper, preferably in lamellar form of 3200–16000 $cm^2/g$ surface area and 1.9–0.45 micron diameter, possibly mixed with a dispersion agent such as ammonium phosphate, polytetrafluoroethylene or highly dispersed $SiO_2$. Also, U.S. Pat. No. 5,233,927 (Wulvik) describes a smoke camouflage system including metallic (e.g. brass) powder, and a cold-flow properties improving material such as aluminum silicate or a sand-blowing material.

The entire contents of each of the above-mentioned U.S. Patents is explicitly incorporated herein by reference.

SUMMARY OF THE INVENTION

The present invention provides in one aspect, flakes of aluminum metal composition, having lateral face dimensions within the range of about 1.5 to about 20 microns and thickness within the range of about 0.03 to about 0.3 micron, wherein the amount of manufacturing process additive with which the flakes are coated has been reduced to between 0 and 2.5 weight percent, preferably to between 0 and 2.0 weight percent.

In another aspect the present invention provides flakes aluminum metal composition, having lateral face dimensions within the range of about 1.5 to about 20 microns and thickness within the range of about 0.03 to about 0.3 micron, and further having a mass extinction coefficient of at least 4.5 $m^2/g$ in respect of infrared radiation and at least 3.5 $m^2/g$ in respect of visible radiation.

In still another aspect, the invention provides a method of screening infrared, visible or millimeter radiation which comprises forming between the source of said radiation and the locus of reception, an aerosol comprising flakes of aluminum metal composition, having lateral face dimensions within the range of about 1.5 to about 20 microns and thickness within the range of about 0.03 to about 0.3 micron, and further having a mass extinction coefficient of at least 4.5 $m^2/g$ in respect of infrared radiation and at least 3.5 $m^2/g$ in respect of visible radiation. In a preferred embodiment, the amount of manufacturing process additive with which the flakes are coated has been reduced to between 0 and 2.5 weight percent, more preferably to between 0 and 2.0 weight percent.

In yet another aspect, the invention provides a formulation selected from pigment pastes, compositions which are vaporizable to form aerosols and particulate solids containing at least one additive in an amount effective to reduce agglomeration in storage, which comprises flakes of aluminum metal composition, having lateral face dimensions within the range of about 1.5 to about 20 microns and thickness within the range of about 0.03 to about 0.3 micron, and having also at least one of the following characteristics (i) and (ii), namely:

(i) a mass extinction coefficient of at least 4.5 m$^2$/g in respect of infrared radiation and at least 3.5 m$^2$/g in respect of visible radiation;

(ii) the amount of manufacturing process additive with which said flakes are coated has been reduced prior to formulation, to between 0 and 2.5 weight percent, preferably to between 0 and 2.0 weight percent.

The expression "aluminum metal composition" as used in the present specification and claims is intended to refer to aluminum metal which is a product of commercial manufacture, possibly containing silicon and/or iron as impurities, as well as the so-called aluminum base alloys of commerce, always provided that such composition is in flake form as defined herein and that it possesses a coating within the defined limits and/or it possesses the minimum mass extinction coefficients as defined herein, in order that it may be suitable for using in the screening method of the invention.

Such terms as "coating" (of the aluminum flakes) and "manufacturing process additive with which the flakes are coated" and similar terms used in the same context, in the present specification and claims, are intended to include any lubricants, greases, casting agents or other additives known to persons skilled in the art, which are effective to coat the aluminum flakes in the course of manufacture, and such terms should be understood accordingly.

DETAILED DESCRIPTION OF THE INVENTION

As stated above, the flakes of aluminum metal composition, which are useful in accordance with the present invention, are those having lateral face dimensions within the range of about 1.5 to about 20 microns and thickness within the range of about 0.03 to about 0.3 micron. In a particular embodiment, the lateral face dimensions, i.e. of length, width, diameter or the like, may lie within the range of about 1.5 to about 14 or 15 microns, while the thickness may lie within the range of about 0.05 to 0.27 micron.

In accordance with a particular embodiment of the invention, aluminum metal composition in flake form (as defined herein) has a mass extinction coefficient of at least 4.5 (preferably at least 5, more preferably at least 5.5, even more preferably at least 6) m$^2$/g in respect of infrared radiation and at least 3.5 (preferably at least 4) m$^2$/g in respect of visible radiation.

Aluminum flake having the dimensions defined herein is generally manufactured by milling together atomized aluminum powder with mineral spirit and coating additive; it generally contains about 3% coating additive and has a mass extinction coefficient of 2.5–3 m$^2$/g in respect of infrared radiation and 2–2.5 m$^2$/g in respect of visible radiation. For most applications such as pigments, paints, inks and coating paper and textiles, both the amount of coating and the mass extinction coefficient are irrelevant. Prior to the present invention, it has been proposed to use aluminum in flake form for screening infrared and visible radiation but it has never been appreciated before the advent of the present invention, to the best of the inventors' knowledge, that the presence or absence of coating or the amount of coating present in the commercial product was of any consequence as regards the utility of the product for screening purposes.

The manufacturing process coating additive may comprise organic material containing at least one moiety selected from the group consisting of hydroxyl (e.g. alcohols, phenols), amine (primary, secondary and/or tertiary), carbonyl (aldehydes or ketones), silyloxy (e.g. silicones, siloxanes), carboxyl, phosphoric acid, sulfonic acid (e.g. petroleumsulfonic acid), and esters, amides and salts of carboxyl, phosphoric acid, and sulfonic acid. Salts may be, e.g. ammonium, or alkali or alkaline earth salts. More generally, the manufacturing coating additive may comprises organic material selected from carboxylic acids (such as palmitic and stearic acids) and salts thereof.

Reduction of the amount of coating additive in accordance with the invention may be achieved in accordance with a particular embodiment, by using less additive in the manufacturing process than is used conventionally. It is believed that this has not been done before owing to lack of motivation, i.e. if the amount of additive is not critical for most applications, there was no motivation before the advent of the present invention to change manufacturing parameters.

In accordance with another embodiment of the invention, reduction of the amount of coating additive organic residues may be achieved by treating the product of commerce containing generally 3% or more coating additive, with an organic solvent such as aliphatic or aromatic hydrocarbons (e.g. hexane or toluene), or esters, and then removing the solvent in a conventional manner, e.g. by filtration, centrifugation or decantation. This process, whether carried out only once or more than once, is capable of reducing the coating content to <2.5%, preferably to <2%. By carrying out the process several times, the amount of coating additive may be reduced to 0.5–1.5%. In this connection, all percentages recited in the present specification and claims refer to percentages by weight based on the total aluminum flake composition. The treatment process may be carried out at ambient temperatures but it is contemplated that raising the treatment temperature should result in a more efficient extraction of the coating additive. Moreover, it is also contemplated that or adding a base will facilitate the removal of the fatty acids, where these are present in the coating. Changing the solvent to a dipolar aprotic solvent such as acetone, acetonitrile, DMF,DMSO,HMPA etc. or halogenated solvent or protic solvent is possible, but special precautions should be taken due to possible incompatibility of some of the these solvents and aluminum flake.

The product (dry aluminum flake) that is obtained according to the above treatment will generally have a bulk density of at least 0.5, generally up to 1.2 and typically about 0.8 g/cc (compared with the commercially available material prior to treatment which has a bulk density about 0.3 g/cc). Also, it has been found that by applying external pressure to the product obtained according to the above treatment, the bulk density of the product can be increased to 1.5 to 2 (typically 1.6 to 1.8) g/cc, with no appreciable loss in mass extinction characteristics. Thus, the product of the present invention, in addition to its improved mass extinction characteristics, exhibits improved effectivity, i.e. a greater screening effect, pep unit volume. Expressed in other words, the product according to the invention will be much mope viable fop the purposes described herein than previously known aluminum flakes. This feature of improved effectivity, due particularly to the combination of increased mass extinction characteristics combined with increased bulk density, is self-evidently of importance in e.g. camouflage systems, canisters, missiles, rockets, etc. where the major limiting factor is the volume.

Examples of flakes of aluminum composition suitable as a starting material for producing the flakes of the present invention, are, for example, those manufactured by Eckart Werke of Furth/Bavaria, Germany. The skilled person will be able to select suitable starting materials from such products of this or other manufacturers, with minimum experimentation, in order to attain the properties of aluminum flake composition of the invention as stated herein, and particularly the preferred combination of mass extinction and bulk density charcacteristics.

The method of the invention fop screening infrared, visible or millimeter radiation by forming between the source of said radiation and the locus of reception, an aerosol comprising the inventive flakes of aluminum metal composition, may be operated by any viable procedures known to persons skilled in the art, e.g. as published in the technical and scientific literature including patent literature such as the U.S. Patents mentioned above.

Similarly, it will be apparent to the skilled artisan that each of the (i) pigment pastes, (ii) vaporizable compositions and (iii) particulate solids containing at least one additive in an amount effective to reduce agglomeration in storage, in accordance with the invention and which are characterized by the fact they contain the inventive flakes of aluminum metal composition, may be formulated by any viable procedures known to persons skilled in the art, e.g. as published in the technical and scientific literature including patent literature such as the U.S. Patents mentioned above. The invention will now be illustrated by the following non-limiting Examples, in which "aluminum powder" means commercial aluminum flakes of dimensions within the range of approx. 0.03–0.3×1.5–20 microns.

EXAMPLE 1

Aluminum powder (10 g) was suspended and stirred at 25° for 1 hour in toluene (60 ml). The suspension was filtered by suction (Buchner funnel, Filter paper Whatman No. 1). The wet powder was resuspended in toluene (50 ml) and treated in the same manner three times and the mother liquor was analyzed each time for fatty acids content (=fatty acid removed) by GC using diphenylmethane as an internal standard (Table 1).

EXAMPLE 2

Aluminum powder (10 g) was treated in the same manner as in Example 1, using chloroform instead of toluene. The fatty acids content in the mother liquor is also shown in Table 1.

mass extinction coefficient of the product both with regard to infrared radiation and visible radiation. This increase in the mass extinction coefficient means that the product in accordance with the invention will be considerably more efficient in screening undesired radiation than in the case of using untreated aluminum flake.

Moreover, the aluminum flake obtained will generally have a bulk density of at least 0.5, generally up to 1.2 and typically, e.g. at the end of the four treatments with either toluene or chloroform, about 0.8 g/cc (c.f. initial material bulk density 0.3 g/cc).

As pointed out above, aluminum flake as thus obtained may be subjected to external pressure, whereby the bulk density of the product can be increased to 1.5 to 2 (typically 1.6 to 1.8) g/cc, with no appreciable loss in mass extinction characteristics. This further treatment is exemplified, in a particular embodiment, in Example 3.

EXAMPLE 3

Aluminum powder (bulk density ~0.3 g/cc; 10 g) was treated with toluene in accordance with Example 1 to give a product having a mass extinction coefficient of approx. 6.0 in respect of infrared radiation and approx. 5.0 in respect of visible radiation, and a bulk density ~0.8 g/cc. The product was then compressed under 5000 psi to give a tablet of bulk density 1.66 g/cc which was broken into small pieces; this product of compression had unchanged mass extinction coefficients in respect of both infrared and visible radiation, i.e. (approx.) 6.0 and 5.0, respectively.

While particular embodiments of the present invention have been described herein, persons skilled in the art will appreciate that many modifications and variations thereof may be made. Thus, the invention is not limited to the particularly described embodiments, but includes any such modifications or variation which lie within the concept, spirit or scope of the present invention, as may be determined by reference to the claims which follow. The skilled addressee will understand that obvious chemical equivalents thereof are also within the contemplation of the present invention.

We claim:

1. Flakes of aluminum metal composition, having lateral face dimensions within the range of about 1.5 to about 20

TABLE 1

| | Treatment of aluminum powder* with organic solvents. | | | | | |
|---|---|---|---|---|---|---|
| Solvent | Volume (ml) | Treatment No. | Fatty acid removed (mg) | Treated Al fatty acid content (%) | Mass extinction coefficient♦ | |
| | | | | | IR | VISIBLE |
| Untreated | | | | | 2.5–3 | 2–2.5 |
| Toluene | 60 | 1 | 100 | 2.0 | 5–5.5 | 3.5–4.5 |
| " | 50 | 2 | 35 | 1.65 | 5.5–6 | 4–4.5 |
| " | 40 | 3 | 10 | 1.55 | 5.5–6.5 | 4–5 |
| " | 40 | 4 | 3 | 1.52 | 6–6.5 | 4–5 |
| Chloroform | 60 | 1 | 65 | 2.35 | 4.5–5.5 | 3.5–4.5 |
| " | 50 | 2 | 25 | 2.1 | 5.5–6.5 | 3.5–4.5 |
| " | 40 | 3 | 15 | 1.95 | 6–7 | 4–5 |
| " | 40 | 4 | 10 | 1.85 | 6–7 | 4–5 |

*10 g containing ~300 mg fatty acid
♦ $m^2/g$

The above Table shows that by reducing the fatty acid content of aluminum flake in accordance with an embodiment of the invention, a significant increase occurs in the microns and thickness within the range of about 0.03 to about 0.3 micron, wherein the amount of manufacturing process additive with which said flakes are coated has been reduced to between 0 and 2.0 weight percent.

2. Flakes according to claim 1, wherein the amount of manufacturing process coating additive has been reduced to 0.5–1.5 weight percent.

3. Flakes according to claim 1, wherein said manufacturing process coating additive comprises organic material containing at least one moiety selected from the group consisting of hydroxyl, amine, carbonyl, silyloxy, carboxyl, phosphoric acid, sulfonic acid, and esters, amides and salts of carboxyl, phosphoric acid, and sulfonic acid.

4. Flakes according to claim 3, wherein said manufacturing coating additive comprises organic material selected from the group consisting of carboxylic acids and salts thereof.

5. Flakes according to claim 4, wherein said organic material is selected from the group consisting of palmitic and stearic acids and salts thereof.

6. Flakes according to claim 1, having a bulk density at least 0.5 g/cc.

7. Flakes according to claim 6, wherein the bulk density is at least 1.5 g/cc.

8. Flakes of aluminum metal composition, having lateral face dimensions within the range of about 1.5 to about 20 microns and thickness within the range of about 0.03 to about 0.3 micron, and further having a mass extinction coefficient of at least 4.5 $m^2/g$ in respect of infrared radiation and at least 3.5 $m^2/g$ in respect of visible radiation.

9. Flakes according to claim 8, wherein said mass extinction coefficient is at least 5 $m^2/g$ in respect of infrared radiation.

10. Flakes according to claim 9, wherein the bulk density is at least 1.5 g/cc.

11. Flakes according to claim 8, wherein said mass extinction coefficient is at least 5.5 $m^2/g$ in respect of infrared radiation.

12. Flakes according to claim 8, wherein said mass extinction coefficient is at least 6 $m^2/g$ in respect of infrared radiation.

13. Flakes according to claim 8, wherein said mass extinction coefficient is at least 4 $m^2/g$ in respect of visible radiation.

14. Flakes according to claim 8, having a bulk density at least 0.5 g/cc.

15. Flakes of aluminum metal composition, having lateral face dimensions within the range of about 1.5 to about 20 microns and thickness within the range of about 0.03 to about 0.3 micron, a bulk density at least 1.5 g/cc, and further having a mass extinction coefficient of at least 5.5 $m^2/g$ in respect of infrared radiation and at least 4 $m^2/g$ in respect of visible radiation.

16. Flakes of aluminum metal composition, which are characterized by having improved properties with respect to their ability to screen infrared, visible or millimeter radiation, when in aerosol form, and which have been prepared by a method which includes the following steps:

(a) providing said flakes having lateral face dimensions within the range of about 1.5 to about 20 microns and thickness within the range of about 0.03 to about 0.3 micron, and which are coated with manufacturing process additive;

(b) treating said flakes provided in step (a) so as to reduce the amount of said additive with which said flakes are coated; and (c) isolating the flakes treated according to step (b), when said treated flakes have a mass extinction coefficient of at least 4.5 $m^2/g$ in respect of infrared radiation and at least 3.5 $m^2/g$ in respect of visible radiation.

17. Flakes according to claim 16, wherein step (b) comprises treating with an organic solvent, and step (c) comprises subsequently removing said solvent and determining that the product has the said minimum mass extinction coefficients.

* * * * *